US011931779B2

United States Patent
(12) United States Patent
Ahmari et al.

(10) Patent No.: US 11,931,779 B2
(45) Date of Patent: Mar. 19, 2024

(54) SMART SCRAPER

(71) Applicant: SAUDI ARABIAN OIL COMPANY, Dhahran (SA)

(72) Inventors: Abdulrahman S. Ahmari, Dhahran (SA); Mohammed S. Al Dabbous, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 536 days.

(21) Appl. No.: 17/173,800

(22) Filed: Feb. 11, 2021

(65) Prior Publication Data

US 2022/0250123 A1 Aug. 11, 2022

(51) Int. Cl.
*B08B 9/04* (2006.01)
*B08B 9/043* (2006.01)
*E21B 37/02* (2006.01)
*B08B 9/055* (2006.01)

(52) U.S. Cl.
CPC ............ *B08B 9/0436* (2013.01); *E21B 37/02* (2013.01); *B08B 9/0557* (2013.01)

(58) Field of Classification Search
CPC .......... B08B 9/0436; B08B 9/00; B08B 9/043
See application file for complete search history.

(56) References Cited

U.S. PATENT DOCUMENTS 5,034,139 A 7/1991 Reid et al.
5,208,936 A * 5/1993 Campbell ............. B08B 9/0551 15/104.061
5,528,790 A * 6/1996 Curran ...................... F28G 1/08 15/104.061
6,802,909 B1 10/2004 Crenshaw
7,354,482 B2 4/2008 Konishi et al.
7,354,483 B2 4/2008 Farris
7,827,646 B2 11/2010 Pruett
2004/0025906 A1 2/2004 Bourrelly et al.
(Continued)

FOREIGN PATENT DOCUMENTS

GB 2576556 A 2/2020
RU 2509613 C2 3/2014
(Continued)

OTHER PUBLICATIONS

International Search Report Issued in Application No. PCT/US2022/016102, dated Jun. 24, 2022, 4 pages.
(Continued)

*Primary Examiner* — Michael D Jennings
(74) *Attorney, Agent, or Firm* — Osha Bergman Watanabe & Burton LLP

(57) ABSTRACT

Provided is a pipeline scraper apparatus that may clean an inside surface of a pipeline. The apparatus may include a body, a water collection recess, a first and a second fluid port, a condenser coil, a lubricant storage tank, and a lubricant. The apparatus is configured to distribute lubricant onto the exterior surface of the body. In the apparatus, a condenser coil may be positioned within the water collection recess, and a lubricant storage tank may be positioned within the interior space. Further provided is a method for using a pipeline scraper apparatus that may include introducing the pipeline scraper apparatus into a pipeline to be treated.

20 Claims, 5 Drawing Sheets

(56) References Cited

U.S. PATENT DOCUMENTS

| | | | | |
|---|---|---|---|---|
| 2013/0125929 | A1* | 5/2013 | Inada | G21C 17/017 134/22.12 |
| 2017/0145299 | A1 | 5/2017 | Schultheiss et al. | |
| 2017/0336032 | A1 | 11/2017 | Krumrine, III et al. | |
| 2018/0230689 | A1* | 8/2018 | Schaafsma | F16D 1/112 |
| 2020/0230668 | A1* | 7/2020 | Baek | B08B 9/051 |

FOREIGN PATENT DOCUMENTS

| | | | |
|---|---|---|---|
| WO | 2019121810 | A1 | 6/2019 |
| WO | 2019202105 | A1 | 10/2019 |
| WO | 2020034008 | A1 | 2/2020 |
| WO | 2020130856 | A1 | 6/2020 |

OTHER PUBLICATIONS

Written Opinion Issued in Application No. PCT/US2022/016102, dated Jun. 24, 2022, 7 pages.
International Preliminary Report on Patentability Issued in Application No. PCT/US2022/016102, dated Aug. 15, 2023, 8 pages.

* cited by examiner

SMART SCRAPER

BACKGROUND

In an oil and gas pipeline, a pipeline scraper (also called a pipeline pig) may be utilized for pipeline operations including, but not limited to, cleaning, maintenance, and inspection. These pipeline operations using a pipeline scraper are common techniques known as "pigging."

The contents in the interior of the pipeline flow in one overall direction. These joint contents can include oil, gas, and other fluids. The overall fluid flow direction allows common pigging techniques, in some instances, to be carried out while process fluids flow through the pipeline. As a result, pipeline flow may continue during cleaning, maintenance, and inspection while using a pipeline scraper.

SUMMARY

This summary introduces a selection of concepts that are further described in the detailed description. This summary is not intended to identify key or essential features of the claimed subject matter, nor is it intended to be used as an aid in limiting the scope of the claimed subject matter.

In one aspect, a pipeline scraper apparatus may be provided for cleaning an inside surface of a pipeline. The pipeline scraper apparatus may include a body having an exterior surface, a water collection recess, a first fluid port, and a second fluid port. The body defines an interior space. The first fluid port is positioned within the water collection recess. The pipeline scraper apparatus may include a condenser coil that is positioned within the water collection recess to condense water from a vapor into a liquid that is present in the water collection recess. The pipeline scraper apparatus may include a lubricant storage tank that is positioned within the interior space. The lubricant storage tank is fluidly coupled downstream of the first fluid port. The lubricant storage tank is configured to contain a lubricant comprised of a mixture of water and a thickening agent. The second fluid port may be fluidly coupled downstream of the lubricant storage tank and is configured to distribute lubricant onto the exterior surface of the body.

In another aspect, a method for using a pipeline scraper apparatus may include introducing the pipeline scraper apparatus into a pipeline to be treated. The pipeline scraper apparatus may include a body having an exterior surface and a water collection recess. The body may also define an interior space. The pipeline scraper apparatus may include a condenser coil that is positioned within the water collection recess. The pipeline scraper apparatus may include a lubricant storage tank that is positioned within the interior space.

Other aspects and advantages of this disclosure will be apparent from the following description made with reference to the accompanying drawings and the appended claims.

DETAILED DESCRIPTION

Figure 1A:
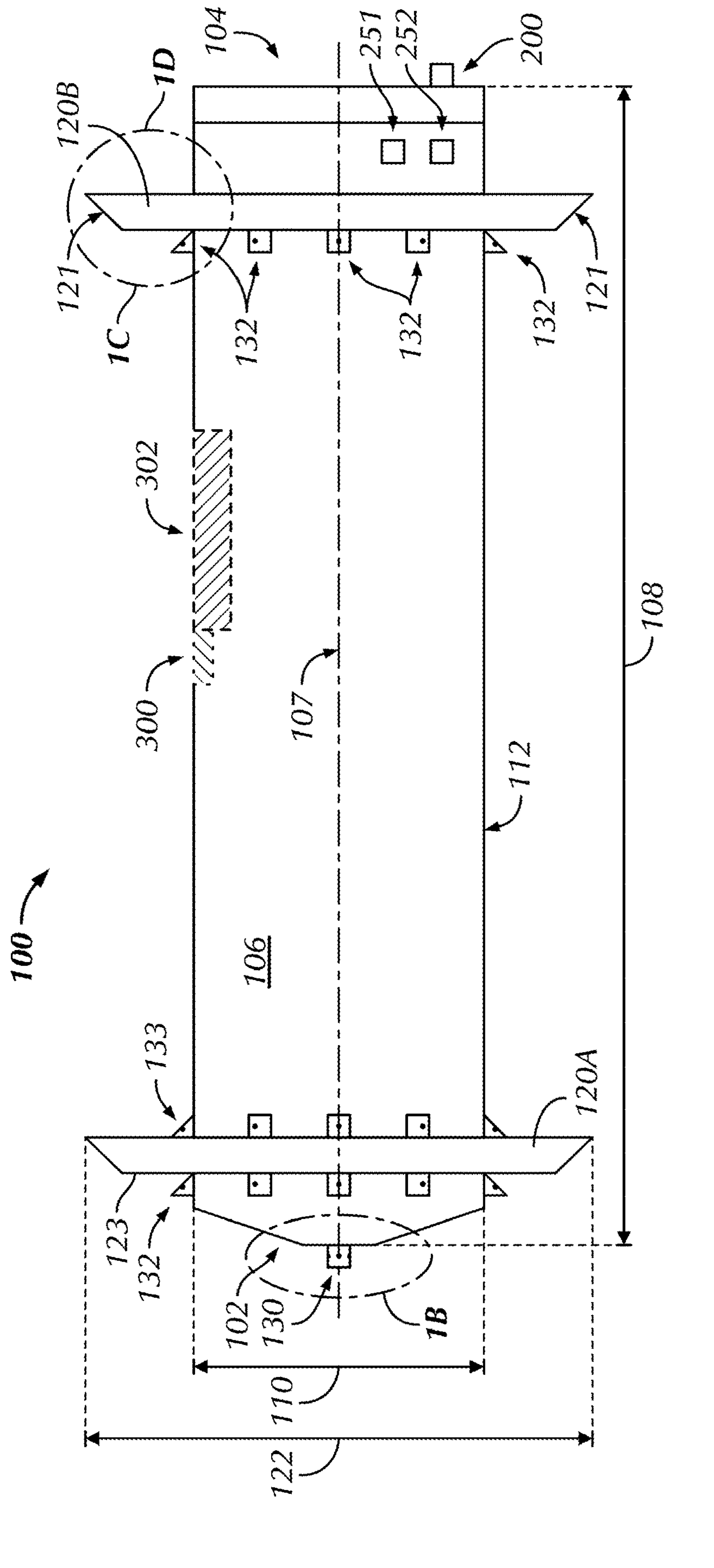
FIG. 1A shows a side view (exterior) of a pipeline scraper according to one or more embodiments.

During pipeline cleaning, a pipeline scraper may become stuck, that is, the pipeline scraper may experience a "stuck issue." A stuck issue is a situation where a pipeline scraper experiences a hindrance within the pipeline that results in a deficient velocity. A deficient velocity includes a scenario where the scraper is being retarded or halted from an expected velocity. When a pipeline scraper becomes stuck, the decreased movement of the pipeline scraper (or component(s) of the pipeline scraper) is to an extent that the function of the pipeline scraper may be impaired. The function of the pipeline scraper includes removing debris and detritus from the interior surfaces of the pipeline.

In addition to becoming stuck during cleaning, a pipeline scraper may become susceptible to corrosion during use. Corrosion of the traditional pipeline scraper includes, but is not limited to, stress cracks and oxidation. For example, stress cracks may lead to a fracture developing in the body or blade of a pipeline scraper. Oxidation may lead to rusting. The environment within the pipeline may contribute to the corrosion of a pipeline scraper.

The internal pipeline environment may include chemicals, including, but not limited to, sulfur-containing chemicals, such as sulfides and sulfur dioxides; water, including vapor and liquid; and both organic and inorganic salts, especially in the form of brines. Oxidizing chemicals, such as those that react in the presence of oxygen, may cause corrosion. Beyond the oxidizing chemicals presented previously, other chemicals in the pipeline may include, but not limited to, chromic acid, bromine, and hydrogen peroxide.

A pipeline scraper may also become susceptible to erosion during use. Erosion is a form of physical damage or wear on the pipeline scraper. For example, erosion includes abrasions and forced surface removal. Where corrosion may occur from chemical damage (such as $H_2S$ or carbonic acid), erosion may occur from physical damage (such as from sand or scale scraping or objects). Both corrosion and erosion may work in conjunction with one another to degrade and eventually destroy portions of the pipeline scraper.

A portion of a pipeline scraper that may be vulnerable to corrosion and erosion are the scraping surfaces, such as the blade or the body of the apparatus. One or more blade of the pipeline scraper is configured to extend from the body of the pipeline scraper such that they frictionally contact the interior surface of the pipeline. During movement of the pipeline scraper, the frictional coupling between the blade and the interior of the pipeline, especially in the presence of debris, such as wax, may cause the blade to "hang up", lag behind, warp, or generally become distorted. These hinderances may be due to differences in friction coefficients between the blade and the different materials on the surface of the pipeline, such as the metal surface, wax, scale, and other hydrocarbon-based debris. Such hinderances can slow down the pipeline scraper and make it lose momentum, requiring more energy or motivation (such as pressure differential) to maintain movement. If a blade becomes stuck, such as in a large gathering of debris or wax, the pipeline scraper may become stuck in the pipeline. Or, in another circumstance, a portion of the blade may become damaged. If a blade becomes damaged, it loses some ability to maintain a pressure seal. A pressure seal separates the differential between upstream and downstream of the pipeline scraper. Further, a damaged blade may prevent it from removing debris.

There are other potential negative impacts from a stuck pipeline scraper or a damaged scraper surface. Secondary effects may include, but are not limited to, the logistical costs in freeing a stuck pipeline scraper, increased labor and material costs for making repairs and retrieval, loss of available manpower, and extended downtime of the pipeline.

One or more embodiments of the present disclosure includes a pipeline scraper apparatus. The apparatus is configured to prevent and mitigate the stuck issues after being introduced into the interior of a pipeline. The pipeline scraper apparatus of one or more embodiments is configured to release a lubricant or a fluid having lubricating properties either when the apparatus is stationary in the interior of a pipeline or when it is traversing the interior of the pipeline. The lubricant is released from the interior of the pipeline scraper toward the outside surfaces of the pipeline scraper through one or more fluid ports in the body. Optionally, one or more nozzle couples to the exterior surface of the body to facilitate lubrication distribution. The lubricant may allow for a decrease in the coefficient of friction between the apparatus and the interior pipeline surface, including against any debris or detritus, such as hydrocarbon solids buildup, scale, or wax, or damage to the interior of the pipeline that may hinder the movement of the pipeline scarper. In one or more embodiments, the lubricant is a mixture of a thickening agent and water.

The lubricant may also reduce or mitigate the effects of chemicals on the pipeline scraper, thereby preventing corrosion compared to a pipeline scraper that does not release lubricant. Intermittently, periodically, or continuously releasing lubricant may reduce or even prevent corrosion. The released lubricant is introduced onto the exterior surface of the pipeline scraper. The lubricant is released such that it coats the external surfaces of the pipeline scraper, creating a barrier between the chemicals in the pipeline and the surface of the pipeline scraper that prevents exposure to corrosive materials.

In addition, the lubricant may buffer the impact of particles or solids that may cause erosion on the exterior surface of the body or the blade of the pipeline scraper. The lubricant may also mitigate the effects of pipeline physical damage and rough debris, such as scale, from damaging the body or blade of the pipeline scraper. The lubricant may significantly reduce the frictional drag against the body or blade, especially one or more portion of the body or blade that is in physical contact with the interior surface of the pipeline.

In one or more embodiments, a method includes using the pipeline scraper apparatus. The method of one or more embodiments includes introducing an apparatus into the interior of the pipeline. The method may further include operating the pipeline such that the apparatus is motivated to traverse through the interior of the pipeline. The method may include determining a condition that is present for passing of lubricant to an exterior surface of the apparatus. The method may include transmitting a command signal to the apparatus such that the apparatus passes a lubricant to the exterior surface of the apparatus.

The method of use may decrease the occurrence of stuck issues with one or more embodiments of the apparatus compared to a pipeline scraper that is not configured to distribute lubricant to an exterior surface. For example, a method of use may include distributing lubricant and operating the pipeline such that the apparatus is freed from a stuck condition. When freed from a stuck condition, the apparatus is more easily motivated to traverse through the interior of the pipeline after lubrication of an exterior surface versus a similar pipeline scraper without the lubricant.

Pipeline Scraper Apparatus: Description of Figures

This section describes one or more embodiments of the pipeline scraper apparatus with respect to the figures.

FIG. 1A depicts a side-view (exterior) of a pipeline scraper 100 of one or more embodiments. At its downhole portion, a nose 102 of the apparatus is shaped in a conical frustum that is part of the body 106 of the pipeline scraper 100, but other shapes may be used. At its uphole portion, a tail 104 of the pipeline scraper 100 is shaped flat like the end of a cylinder, but other shapes may be used. The body 106 of the pipeline scraper 100 has a body length 108 and a body diameter 110. The body 106 has a thickness (not labeled) of material.

As shown, coupled circumferentially to the exterior surface 112 of the body 106 of the pipeline scraper 100 are shown more than one blade 120 (or scrapers). The blade 120 pair shown includes a forward positioned blade 120A and an aft position blade 120B. The blade 120 pair is shown extending perpendicular to a central longitudinal axis 107 of the pipeline scraper 100. Blade 120 at its outward portion from the body 106 is configured with a scraping edge 121 for contacting a pipeline interior surface. The blade 120 has a blade diameter 122 measured from the outer tips of opposing scraping edges and is larger than the body diameter 110. The blade 120 has an exterior surface 123.

At the nose 102 of the apparatus, a nose lube nozzle 130 protrudes from and is coupled to the exterior surface 112 of the body 106 of the pipeline scraper 100. The nose lube nozzle 130 is configured to distribute lubricant that may flow back towards the aft portion of the body 106 along the nose 102, creating a lubricated layer on the exterior surface 112. Proximate to and distributed circumferentially and periodically spaced around the body 106 downstream of blade 120 is more than one blade lube nozzle 132 coupled to the exterior surface 112 of the body 106. The more than one blade lube nozzle 132 distributes lubricant, such as by an atomizing or jet spray, onto the downstream-facing exterior surface 123 of the associated blade 120. More than one body lube nozzle 133 is shown positioned circumferentially and periodically around the body 106 to distribute lubricant behind the forward positioned blade 120A to cover portions of the exterior surface 112 of the body 106.

Figure 1B:
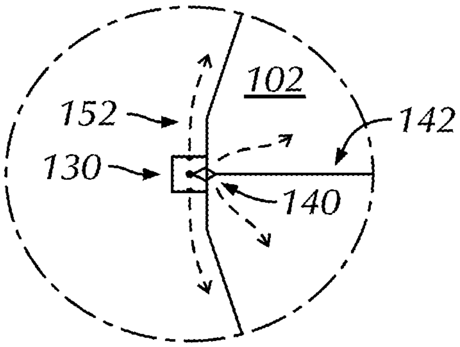
FIG. 1B shows added detail regarding a nose lube nozzle according to one or more embodiments.

FIG. 1B shows added detail about a nose lube nozzle. FIG. 1B is shown in partial reveal. Nose lube nozzle 130 is fluidly coupled downstream of a lube port 140, which is an opening—a fluid port—in the body 106 of the pipeline scraper 100. The second fluid port is configured to allow one-way fluid communication from the interior of the pipeline scraper 100 outward. FIG. 1B shows nose lube nozzle 130 mounted on the exterior surface 112 of nose 102.

Lubricant supply line 142 supplies lubricant to the exterior surface 112 via nose lube nozzle 130. FIG. 1B shows multiple streams of lubricant flow 152 (dashed arrows) distributed from nose lube nozzle 130. The lubricant covers the nose 102 with a protective layer of lubricant. Excess lubricant may continue to flow along the exterior surface 112 of the nose 102 and body 106 towards the aft. This type of lubricant distribution may be similar in effect to the distribution of lubricant made by the one or more body lube nozzle 133.

Figure 1C:
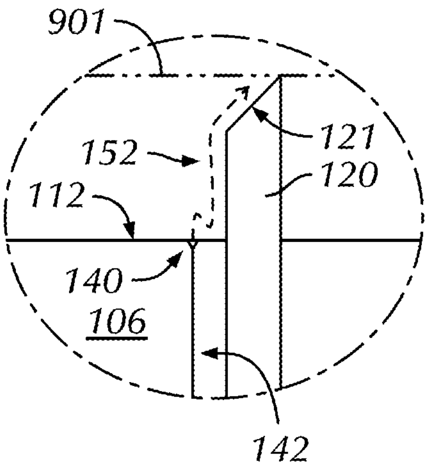
FIG. 1C shows added detail regarding an open lube port configuration according to one or more embodiments.

FIG. 1C shows added detail regarding an open lube port configuration. FIG. 1C is shown in partial reveal. The lube port 140 is an opening—a fluid port—in the body 106 of the pipeline scraper 100. The second fluid port is configured to allow one-way fluid communication from the interior of the pipeline scraper 100 outward. The lube port 140 may selectively allow lubricant from lubricant supply line 142 to flow 152 (dashed arrow) onto the exterior surface 112 of the body 106. FIG. 1C also shows a pipeline wall 901 (in relief) where the scraping edge 121 of the blade 120 makes frictional contact. The lubricant may also flow onto the exterior surface 123 of the blade 120. The lubricant, as it flows across the exterior surface 123 of the blade 120, may also flow towards the scraping edge 121 and the pipeline wall 901, thereby lubricating both surfaces at their point of contact.

Figure 1D:
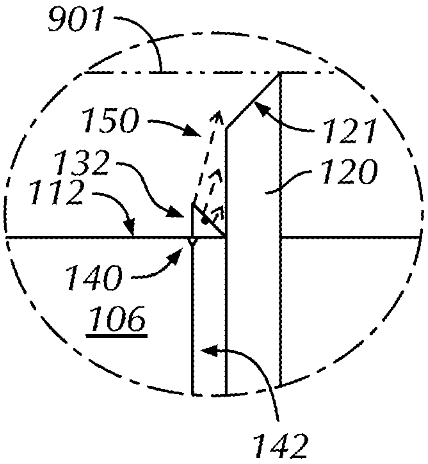
FIG. 1D shows added detail regarding a blade lube nozzle according to one or more embodiments.

FIG. 1D shows added detail about a blade lube nozzle. FIG. 1D is shown in partial reveal. Blade lube nozzle 132 couples to the exterior surface 112 of the body 106. Blade lube nozzle 132 is fluidly coupled downstream of a lube port 140, which is an opening—a fluid port—in the body 106 of the pipeline scraper 100. The second fluid port is configured to allow one-way fluid communication from the interior of the pipeline scraper 100 outward. The blade lube nozzle 132 is provided with lubricant through lube port 140 by lubricant supply line 142 (dashed lines). FIG. 1D shows lubricant spray 150 (arrows) from the blade lube nozzle 132 onto one or more exterior surface 112, 123 of body 106 and blade 120, respectively. FIG. 1D also shows a pipeline wall 901 (in relief) where the scraping edge 121 of the blade 120 makes frictional contact. The spray 150 is shown such that, in some instances, lubricant may coat a portion of the pipeline wall 901 proximate to the scraping edge 121 of the blade 120. Such a covering spray may help reduce friction between the scraping edge of the blade and the pipeline wall.

Returning to FIG. 1A, an optically transparent surface 300 is present between the blade 120 pair along the body 106 of the pipeline scraper 100. A screen 302 is also present between the blade 120 pair. Both the optically transparent surface 300 and the screen 302 are configured to conform with the general shape of the exterior surface 112 to provide a uniformly shaped exterior surface.

Further shown in FIG. 1A is a receiver and transmitter antenna (R/T antenna) 200 protruding from the tail 104 of the pipeline scraper 100. The R/T antenna 200 is coupled to a R/T unit, which will be described further. The R/T antenna 200 is shown with a shielding cover (not labeled) that is EM-transmissive to protect the R/T antenna 200 from pipeline fluids and conditions while still permitting operation.

Further shown in FIG. 1A, there are several sensors extending through the body 106 of pipeline scraper 100. A humidity sensor 251 proximate to the tail 104 is configured to detect the actual vapor pressure of the vapor around the pipeline scraper 100. A location sensor 252 proximate to the tail 104 is configured to detect the relative location of the pipeline scraper 100.

Figure 2:
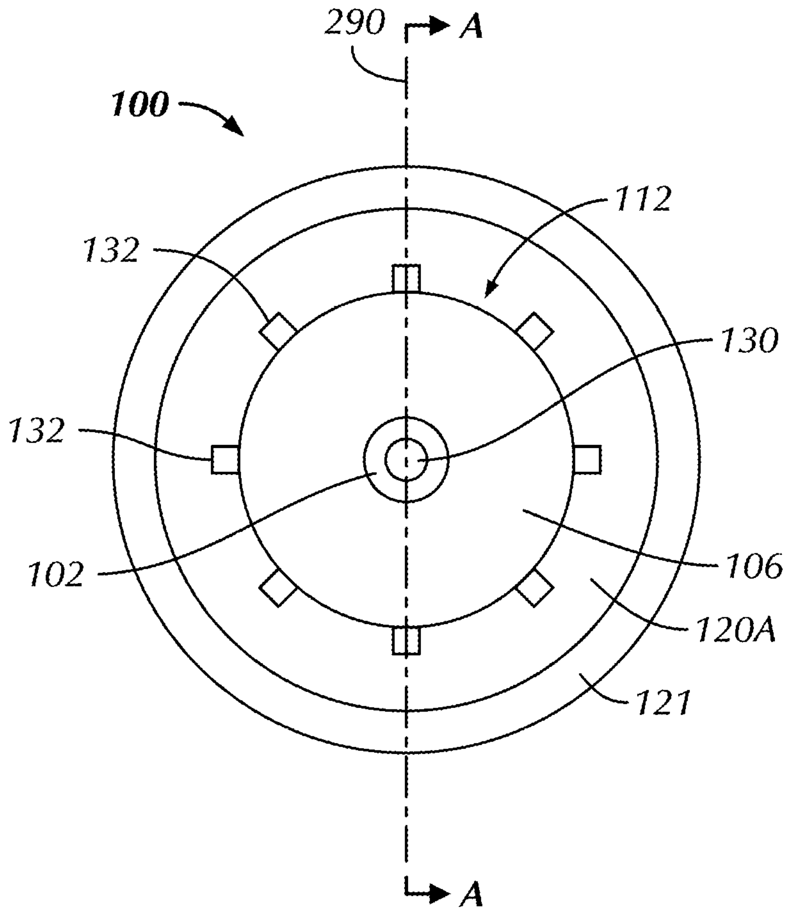
FIG. 2 shows a frontal view (exterior) of the pipeline scraper according to one or more embodiments.

FIG. 2 depicts a front-view (exterior) of a pipeline scraper 100 of one or more embodiments. The view is as if an observer is viewing the pipeline scraper 100 via the central longitudinal axis (not visible) from front to aft. The nose lube nozzle 130 is visible positioned at the front portion of the nose 102, which is a portion of the exterior surface 112 of the body 106 of the pipeline scraper 100. The forward positioned blade 120A, its scraping edge 121, and its forward-facing exterior surface 123 couple to the exterior surface 112 along its circumference. More than one blade lube nozzle 132 is shown coupled to and distributed periodically and circumferentially around the exterior surface 112 to the body 106, directed towards the forward positioned blade 120A. A bifurcation line "AA" 290 in FIG. 2 supports FIG. 3, as will be described further.

Figure 3:
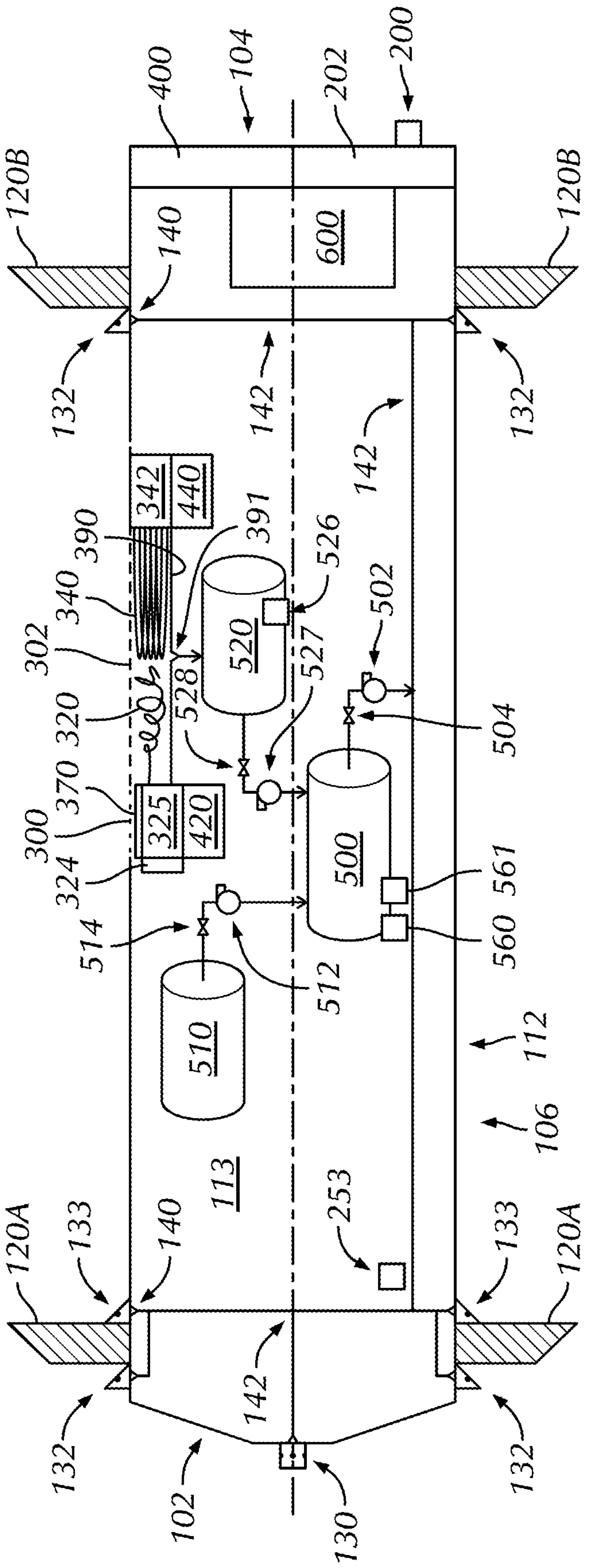
FIG. 3 shows a cross-section side view of the pipeline scraper according to one or more embodiments.

FIG. 3 depicts a cross-section view (cutaway along bifurcation line "AA" 290 of FIG. 2) of the pipeline scraper 100. The cross-section view shows the interior space 113 of the pipeline scraper 100 as defined by the body 106.

FIG. 3 shows lubricant supply lines 142 in the interior space 113. The lube port 140 and lubricant supply lines 142 couple the downstream nose lube nozzle 130, the more than one blade lube nozzle 132, and the more than one body lube nozzle 133, to an upstream lubricant storage tank 500.

Fluid tanks may be present in the interior space 113 of the pipeline scraper 100. The lubricant storage tank 500 may mix lubricant components to make lubricant and hold such lubricant in reserve until distributed. A lubricant storage tank control valve 504 may be positioned downstream from the lubricant storage tank 500. The lubricant storage tank control valve 504 may selectively allow the lubricant to be provided into lubricant supply lines 142. The lubricant distribution pump 502 may pump upon activation lubricant through the lubricant supply lines 142.

The interior space 113 may also further house a thickener storage tank 510 for retaining thickening agent to fabricate lubricant. The thickener storage tank 510 may be fluidly coupled upstream of the lubricant storage tank 500 through a thickener supply line (not labeled for clarity). The thickener storage tank control valve 514 position may be downstream from the thickener storage tank 510. The thickener storage tank control valve 514 may selectively allow the thickening agent to be provided into the thickener supply line to the lubricant storage tank 500. The thickener distribution pump 512 may pump upon activation thickening agent through the thickener supply line.

FIG. 3 shows a water storage tank 520 in the interior space 113 of the pipeline scraper 100 for retaining water to fabricate lubricant. The water storage tank 520 may be fluidly coupled upstream of the lubricant storage tank 500 through a water supply line (not labeled for clarity). Further, the water storage tank may be fluidly coupled downstream of a first fluid port. A water storage tank control valve 528 may be positioned downstream from the water storage tank 520. The water storage tank control valve 528 may selectively allow water to be provided into the water supply line to the lubricant storage tank 500. The water distribution pump 527 may pump upon activation water through the water supply line.

Sensors that are shown in FIG. 3 associate with the various fluid tanks that may be present. The lubricant storage tank 500 is shown with two optional sensors: a composition sensor 560 and a level sensor 561. The composition sensor 560 may determine if the appropriate mixture of water to thickening agent is present in the lubricant in the lubricant storage tank 500. The level sensor 561 of the lubricant storage tank 500 may detect the amount of lubricant in the lubricant storage tank. The level sensor 526 of the water storage tank 520 may detect the amount of water in the water storage tank.

Other sensors may also be present. As previously described in FIG. 1A, the humidity sensor 251 may detect the actual vapor pressure of the vapor around the pipeline scraper 100. A location sensor 252 may detect the relative location of the pipeline scraper 100. A motion sensor 253 may detect the overall motion of or changes in motion to the pipeline scraper 100 depending on its configuration.

FIG. 3 shows an indentation or recess defined in the exterior surface 112 of body 106 of the pipeline scraper 100. Such a recess may collect liquid, condensed water. The water collection recess 390 collects condensed liquid water and directs the liquid into a water port 391, which is an opening—a fluid port—in the body 106 of the pipeline scraper 100. The water port is configured to allow one-way fluid communication into the interior from the exterior of the pipeline apparatus. Water collection recess 390 couples upstream of water storage tank 520 through water port 391. The water enters the water storage tank 520 through a water supply line (not labeled for clarity).

There is a screen 302, as previously described, that covers the water collection recess 390 that conforms to the general shape of the exterior surface 112. Screen 302 may be vapor permeable, that is, it may prevent liquids, such as lubricant or pipeline fluids, from entering the water collection recess 390. Screen 302 may merely be a mesh screen. In some instances, the screen 302 may be configured to selectively permit vapor and liquid water to traverse from the exterior into the water collection recess 390, similar to a membrane. The vapor that flows across the screen is water vapor.

In FIG. 3, there may a condenser coil present in the water collection recess. A condenser coil may extract or condense gaseous water from the vapor present in the water collection recess. The condenser coil extracts or releases the collected water as a liquid, depending on its configuration. Pipeline scraper 100 is shown with two condenser coils: a MOF condenser coil 320 and a traditional condenser coil 340.

The MOF condenser coil 320 may physically and electrically couple to a MOF condenser power unit 325. The MOF condenser unit fan 324 may cool the MOF condenser power unit 325 and the MOF condenser coil 320. The MOF condenser power unit 325 may selectively provide power to the MOF condenser coil 320 such that it may selectively absorb water vapor from the vapor in the water collection recess 390 and then desorb the water as a liquid into the water collection recess 390. The MOF condenser power unit 325, the set of solar pads 370, the MOF condenser battery 420, and the MOF condenser unit fan 324, may be electrically or physically coupled or connected to supply power, charge, support, or cool the units supporting the MOF condenser coil 320.

There is an optically transparent surface 300, as previously described with FIG. 1A, that may cover the set of solar pads 370. Optically transparent surface 300 may be shaped to conform with body 106 and sealed to prevent fluids, such as lubricant or pipeline fluids, from damaging the set of solar pads 370. As well, the optically transparent surface 300 may permit solar light or other EM-transmissive sources to interact with the set of solar pads 370. The solar pads 370 may direct power to one or more of MOF condenser power unit 325, the MOF condenser battery 420, and the MOF condenser unit fan 324; may provide an electrical charge to the MOF condenser battery 420; or both.

The traditional condenser coil 340 may physically and electrically couple to a condenser coil power unit 342. The condenser coil power unit 342 provides power to a compressor (not shown) that provides refrigerant to the traditional condenser coil 340 The traditional condenser coil 340 may cool the vapor present in the water collection recess 390 into liquid water. The condenser battery 440 may electrically couple to the condenser coil power unit 342. The traditional condenser coil may have a fan (not shown), similar to the MOF condenser unit fan.

An optional external fan (not shown) may draw gases across the one or more types of condenser coil in the water collection recess to facilitate condensation.

FIG. 3 shows a receiver/transmitter (R/T) unit 202 in the interior space 113 of the pipeline scraper 100. The R/T unit 202 is coupled to the R/T antenna 200, which has been previously described associated with FIG. 1A. The R/T unit 202 may detect remotely transmitted EM-based signals and may transmit in return EM-based signals through the R/T antenna 200. The R/T unit 202 may receive digital signals from computer control system 600, convert the signals from digital to electromagnetic (EM) format, and then transmit the EM-based signals from the pipeline scraper 100 to a manual or automatic remote control unit (not shown). As well, the R/T unit 202 may receive via the R/T antenna 200 EM-based signals from a manual or automatic remote control unit (not shown), convert the EM-based signals into a digital format, and pass the digital signals to the computer control system 600 for interpretation.

In FIG. 3, a battery 400 is shown. The battery 400 may provide electrical power and other forms of energization. The battery 400 may be electrically (or if other forms of energization are used other means) coupled to units requiring power for operation within pipeline scraper 100, including, but not limited to, the thickener distribution pump 512, the thickener storage tank control valve 514, the water distribution pump 527, the water storage tank control valve 528, a composition sensor 560 for the lubricant storage tank 500, a level sensor 561 for the lubricant storage tank 500, the lubricant distribution pump 502, the lubricant storage tank control valve 504, the computer control system 600, R/T antenna 200, and the R/T unit 202. The power distribution lines within pipeline scraper are not shown for the sake of clarity; however, one of ordinary skill in the art may envision such a power distribution network.

In FIG. 3, an optional computer control system 600 is shown included with pipeline scraper 100. The physical components of computer control system 600 is in signal communication with units within pipeline scraper 100 configured to be in one-way or two-way signal communication, for example, a temperature sensor (one-way) or the R/T unit (two-way). Examples of such components includes, but are not limited to, the lubricant storage tank control valve 504, the lubricant distribution pump 502, the thickener storage tank control valve 514, the thickener distribution pump 512, the water storage tank control valve 528, the water distribution pump 527, the various sensors previously described, the MOF condenser power unit 325, the condenser coil power unit 342, the R/T antenna 200, and the R/T unit 202. The signal relay lines within pipeline scraper are not shown for the sake of clarity; however, one of ordinary skill in the art may envision such a signal relay distribution network.

Pipeline Scraper Apparatus: Detailed Embodiments

One or more embodiments provide a pipeline scraper apparatus for cleaning an inner surface of a pipeline.

Body of Pipeline Scraper

In one or more embodiments, the apparatus includes a body. The body of the apparatus is configured for use inside a pipeline that has or has contained hydrocarbons, including hydrocarbons with hydrogen sulfide and carbon dioxide.

The body of the apparatus may have any general physical configuration, including a cylindrical shape, which has an exterior surface and defines an interior space. The body of the apparatus forms an enclosed shell. The exterior surface of the body couples or connects to components of the apparatus on an exterior surface, such as, in some instances, one or more blade, and one or more nozzle. The body, defining the interior space, may contain components, such as one or more of batteries, computers, liquid tanks, signal lines, power lines, fluid lines, and receiver/transmitters, that permit operations of the pipeline scraper. There is also sealed ports through the body that permit traversal through the body, such as by a receiver/transmitter (R/T) antenna or an external sensor, such that they may be partially positioned and in communication with the exterior of the apparatus.

The outer diameter of the body of the apparatus, that is, the diameter formed by the exterior surface, may be associated with the inner pipeline diameter. In one or more embodiments, the body of the pipeline scraper is envisaged to traverse the interior of a pipeline in a range of from about 1.5" up about 40" (inner) diameter. The outer surface diameter allows the apparatus to maneuver within the pipeline. In one or more embodiments, the outer diameter of the body of the pipeline scraper is equal to the inner diameter of the pipeline. In one or more embodiments, the outer diameter of the body of the pipeline scraper is less than the inner diameter of the pipeline. In one or more embodiments, clearance between the outer diameter of the body of the apparatus and the inner pipeline diameter is in a range from about 0.5 inches (") to about 1.5".

In one or more embodiments, a length of the pipeline scraper (body length, as measured along a line parallel with the central longitudinal axis) is in a range of from about 1 meter to about 5 meters. Accommodation for the length may include factors as previously described, such as pipeline diameter, length, curvature of the pipeline, and pipeline scraper exterior diameter.

The body of the pipeline scraper comprises materials that withstand chemical and physical conditions present within an operable pipeline. In one or more embodiments, the body of the pipeline scraper material is alloys of metal, non-metallic materials, and combinations thereof.

Chemical and physical conditions in the pipeline may include, but are not limited to, pipeline temperatures in a range of from about 60 to about 150° F., pipeline pressures in a range of from about 0 to 50 pounds per square inch (psi), sulfur-containing chemicals, such as sulfides and sulfur dioxides, hydrocarbons that flow through the pipeline, and residues thereof. Other gases and liquids (chemical conditions) that may be encountered in the pipeline include carbon dioxide, nitrogen, and water.

First Fluid Ports

There may be one or more ports in the body that permit fluids, such as liquid water, to traverse one-way from the exterior of the pipeline scraper into the interior of the body. As previously described, a one-way water port may couple the water collection recess with an internal water storage tank or with the lubricant storage tank such that the water collected in the water collection recess is directed into the interior of the pipeline scraper.

In some instances, the first fluid port may have a passive valve associated downstream such that fluid may flow through the first fluid port when there is sufficient force, pressure, or weight acting upon it, for example, a check valve. In other some instances, the first fluid port may have an active valve associated downstream such that fluid may flow through the first fluid port when a valve is affirmatively opened through a change in energization state, such as a control valve.

Second Fluid Ports

There may be one or more ports in the body that permit fluids, such as lubricant, to traverse one-way from the interior of the body to the exterior of the pipeline scraper. As previously described, a one-way lube port may couple the lubricant storage tank such that lubricant distributed from the lubricant storage tank is directed through the lube port, onto the exterior surface of the body of the pipeline scraper, and then onto the exterior surface of the blade, if present.

In some instances, the second fluid port may have a passive valve associated with it upstream such that fluid may flow through the second fluid port when there is sufficient force, pressure, or weight acting upon it, for example, a check valve. In other some instances, the second fluid port may have an active valve associated with it upstream such that fluid may flow through the second fluid port when a valve is affirmatively opened through a change in energization state, such as a control valve. This may prevent inadvertent contamination or blockage of the lubrication system by pipeline fluids and debris.

One or more of the second fluid ports are associated with a nozzle. As previously described, a nozzle couples to the exterior surface of the pipeline scraper downstream of the second fluid port. The nozzle directs lubricant fluid flow, such as by spraying, across the exterior surface of the body and the exterior surface of the blade, if present.

Pipeline Scraper Blade

Optionally, the apparatus includes one or more blade. The blade is also called a scraper. The term "blade" may refer to a plurality of blades. The blade of the pipeline scraper may be configured to frictionally contact the interior surface of the pipeline to remove detritus, including, but not limited to, debris, sludge, aggregates, wax, scale, rust, condensed liquids, gels, polymers, and carbon buildup. The configuration of the blade may also permit and maintain a differential fluid pressure or fluid flow, such as a fluid slug driving the apparatus, that may be used to motivate the pipeline scraper through the pipeline. Such a blade configuration may be present even if the pipeline scraper is self-motivated, such as with a tractor system, to pull or push the pipeline scraper along the interior of the pipeline.

When the pipeline scraper includes an optional blade, the apparatus may comprise more than one blade. In one or more embodiments, the pipeline scraper apparatus includes from 2 to 6 blades.

The angle of the optional blade may be in any suitable configuration for scraping the inner surface of a pipeline. In one or more embodiments, the blade may be physically configured at an angle perpendicular to the central longitudinal axis. The blade radially extends outward at an angle perpendicular to the central longitudinal axis from the exterior surface of the body to an outer blade diameter. In one or more embodiments, the angle of the blade may be in a range of from substantially in alignment with the central longitudinal axis in a downstream direction to an upstream direction. That is, the angle of the blade may be in a range of from about −89.9° to about +89.9° deviation from the perpendicular of the central longitudinal axis.

The outer blade diameter is the diameter of a blade as measured using opposing points of the scraping edge while traversing through the central longitudinal axis. The outer blade diameter is the fullest extension of the blade. That is, the one or more blade is mechanically or physically in its normal state, without distortions or folds.

The outer blade diameter, if used, is associated with the interior diameter of the pipeline in which it is used. The blade frictionally contacts the interior surface of the pipeline. In one or more embodiments, the configuration of outer blade diameter will be slightly larger than the interior diameter of the pipeline. In such instances, the excess length will cause the scraping edge of the blade to fold against the interior surface of the pipeline, creating a frictional surface and a strain force of the one or more blade against the interior surface of the pipeline. Such pressing force of the one or more blade against the interior surface of the pipeline is believed to assist in removing debris and in maintaining a fluid-tight seal. The fluid-tight seal is between scraping edge and the interior of the pipeline surface. In one or more embodiments, the outer blade diameter will be the same diameter as the interior diameter of the pipeline.

The blade comprises materials configured to withstand the chemical and physical conditions within the pipeline. In one or more embodiments, the blade material is metal or alloys thereof, non-metallic materials, and combinations thereof. In one or more embodiments, the plurality of blades is comprised of the same material.

A blade may have a scraping edge shape including, but not limited to, a sharp edge, a squared edge (or a flat edge), or a rounded edge. The outer portion of a blade may have a scraping edge. The blade may further include other physical features, including, but not limited to, a brush or brush blade, to aid in removing and pushing debris along.

In one or more embodiments, a blade may be integrated into the body of the pipeline scraper, that is, the blade and the body may comprise a singular unitary piece. In another one or more embodiments, the blade and the body configure to couple to one another. That is, the blade is detachable. In another one or more embodiments, a first blade may be integrated into the body of the apparatus and a second blade may be coupled to the body of the pipeline scraper.

Tanks

In one or more embodiments, the apparatus includes one or more tank. The one or more tank may be utilized for storage. The storage includes that of liquids, solids, and combinations thereof. The one or more tank material is metal. The tank may include, for example, a water storage tank, a thickener storage tank, a lubricant storage tank (lubricant storage tank), and combinations thereof.

Water Storage Tank

In one or more embodiments, a water storage tank may be included as part of the apparatus. The water storage tank may be configured to hold water or a mixture of water and aqueous soluble additives. The capacity of the water storage tank depends on the ratio of lubricant to water being used. In one or more embodiments, a water level sensor may couple to the water storage tank.

In instances where there is a water storage tank, a dedicated supply line may feed liquid water to the lubricant storage tank. The water supply line may include a water distribution pump to overcome effects of gravity and to supply flow. The water supply line may further include a water storage tank control valve to selectively allow water distribution to the lubricant storage tank. The control valve may also prevent fluid from flowing back into the water storage tank, for example, when the apparatus position inverts away from an upright position.

In one or more embodiments absent a water storage tank, the apparatus may route water collected in the water collection recess into the lubricant storage tank directly through the first fluid port.

Thickener Storage Tank

In one or more embodiments, a thickener storage tank may be included as part of the apparatus. The thickener storage tank may be configured to hold chemicals inside, including thickening agents. The capacity of the thickener storage tank may be up to 3,000 cubic centimeters. The thickening agents may mix with the water and aqueous soluble additives.

In one or more embodiments, the thickener storage tank may be filled before the pipeline scraper may be introduced into a pipeline. The thickener storage tank may be filled by an operator or operation during routine maintenance.

In some embodiments, the thickener storage tank is configured to hold a liquid thickening agent. In some other embodiments, the thickener storage tank is configured to hold a solid thickening agent.

In instances where the apparatus includes a thickener storage tank, a separate dedicated supply line may feed thickener to the lubricant storage tank. The thickener supply line may include a thickener distribution pump to overcome effects of gravity and to supply flow. This may be applicable for a liquid or a solid thickener. Common examples of thickening agents include, but they are not limited to, xanthan gum and guar gum. The thickener supply line may include a thickener storage tank control valve to allow thickener distribution to the lubricant storage tank and to prevent backflow as previously described.

In one or more embodiments, a dedicated thickener storage tank is absent from the apparatus. In some configurations, the lubricant storage tank may hold a solid "sparingly soluble" thickener. Such a material dissolves sparingly in the presence of water; any excess material in the tank stays a solid until more water is supplied to the tank. The "sparingly soluble" solid thickener may remain in the lubricant storage tank while adding water into it.

Lubricant Storage Tank

A lubricant storage tank (lubricant storage tanks) is included as part of the apparatus. The lubricant storage tank is configured to contain a mixture of chemicals that includes water and aqueous soluble additives and thickener such that the lubricating fluid forms. The capacity of the lubricant storage tank may be up to 3,000 cubic centimeters.

Lubricant

In one or more embodiments, a lubricant is a mixture of water and a thickening agent. The thickening agent may be polymer based. The thickening agent may be sparingly soluble or completely soluble when mixed with water. In one or more embodiments, the thickening agent is xanthan gum, guar gum, or a combination of xanthan gum and guar gum.

The lubricant storage tank holds the lubricant. The apparatus is configured to release the lubricant (from the lubricant storage tank) through the second fluid port. In some instances, a nozzle is coupled downstream of the second fluid port on the exterior surface of the apparatus. The ports and one or more optional nozzle, positioned at points around the apparatus, selectively discharge the lubricant. That is, the nozzle sprays lubricant or the nozzle releases lubricant. In addition, ports and one or more optional nozzle may distribute the lubricant onto the exterior surfaces of the pipeline scraper body.

The lubricant may provide friction reduction between an exterior surface of the apparatus and another surface. An exterior surface of the apparatus includes the exterior surface of the body and the exterior surface of the blade. Another surface may include the pipeline interior surface. The surfaces may be in contact with other solids, liquids, and gases, within the pipeline, such as sand, debris, sludge, scale, hydrogen sulfide, carbon dioxide, brines, aggregates, and carbon buildup.

In general, an applied force may overcome friction between surfaces. But the amount of applied force reduces upon introducing a lubricant. This means, when the apparatus releases a lubricant then less applied force may overcome friction between surfaces. Among other things, this can help free an apparatus that is in a stuck position.

In addition, a force is applied to maintain a velocity of the apparatus in the pipeline. Again, upon introduction of the lubricant, less applied force may help maintain an apparatus' velocity. The velocity may be forward or rotational velocity.

The lubricant may be a mixture of chemical thickening agent to water in a range of from about a 10:1 ratio to a 1:10 ratio, such as a 10:1 ratio, a 5:1 ratio, a 4:1 ratio, a 3:1 ratio, a 2:1 ratio, a 1:1 ratio, a 1:2 ratio, a 1:3 ratio, a 1:4 ratio, a 1:5 ratio, or a 1:10 ratio. In one or more embodiments, the ratio of water to thickener to make the lubricant is about 1:3.

The one or more tank may affix to or position in a suitable location within the body. For example, a suitable location within the body for the one or more tank may be away from heat sources or components that may affect the storage or mixing within the liquid storage tank. The one or more tank may be between one or more conduit that couples to the inlet of the liquid storage tank, the outlet of the tank, or both. There may be bracing within the body of the apparatus such that the apparatus may rotate.

Condenser

In one or more embodiments, the apparatus includes one or more condenser. In one or more embodiments, the pipeline scraper may include more than one type of condensers.

Traditional Condenser

One type of condenser may be a "traditional" coolant-based condenser system, where a condenser compresses and pumps a chilled refrigerant fluid through a condenser coil. The composition and configuration of the traditional condenser uses standard and known configurations of compression to refrigerate a fluid and pump it through the condensing coil. Heat absorbed from the surrounding vapor, such as in the water collection recess, causes parts of the gas to condense into liquid, such as condensed water. The condensed water moves into the interior of the pipeline scraper via the first fluid port, which is defined in the body as part of the water collection recess.

The traditional condenser may couple to a water collection recess. The condenser coil of the traditional condenser is within the water collection recess. The water collection recess is a space where vapor may be chilled to condense water using the traditional condenser. The water collection recess is defined by the exterior surface of the body. The configuration of the water collection recess may protect the condenser coil(s) by keeping it inside the exterior shape of the body. This prevents physical damage to the condensation coil(s) during apparatus use within a pipeline. While the condenser coil is within the water collection recess, the other condenser components are internal to the pipeline scraper apparatus and sealed from the pipeline environment.

A screen may overlay the water collection recess, facilitating the prevention of damage to the condenser coil. The screen, allowing vapor inside, is impermeable to water and permeable to water vapor. A foamed fluoropolymer may function as the material for the screen.

In one or more embodiments, the exterior surface of the condenser coil may have a hydrophobic surface. A hydrophobic surface is a coating of hydrophobic material. This material may be a superhydrophobic material, such as one able to have a contact angle over 150 degrees (with water).

The hydrophobic surface may couple or connect to the exterior surface of the condensing coil. Such a hydrophobic surface may allow liquid water to form smaller liquid droplets than without the hydrophobic surface on the condenser coil. The hydrophobic surface promotes condensation of water vapor onto the exterior surface for water collection. A Cassie state of contact angle on the hydrophobic surface promotes condensation of water vapor. The hydrophobic surface reduces drag of condensation across it and improves fouling resistance. This supports condenser efficiency over the duration of a lifetime of the condenser.

Condenser with Metal Organic Frameworks

In one or more embodiments, the apparatus may include a type of condenser having a condenser coil comprising a metal organic framework (MOF). In one or more embodiments, the MOF condenser coil of the "MOF condenser system" may include MOFs. In one or more embodiments, the MOF condenser coil may consist essentially of MOFs.

The MOF condenser system may include a MOF condenser coil, a MOF condenser unit fan, and a MOF condenser power unit. The MOF condenser coil (having MOFs) is configured to trap and collect water present in the vapor space of the water collection recess in the MOFs. MOFs (and MOF-containing materials) are known in the art as porous materials that may be used to trap chemicals, including, but not limited to, water, in the form of water vapor or liquid water. The MOF condenser allows for the uptake of water vapor or condensed water (such as liquid water) into pores within the interior of the MOFs.

In one or more embodiments, the MOFs in the MOF condenser coil may include zinc or zirconium-based MOFs. One or more examples of zinc or zirconium-based MOFs include, but are not limited to, $Zn_2$(DOT) (DOT=2,5-dioxidoterephthalate), $Zn_4O(BTB)_2$ (BTB=benzene-1,3,5-tribenzoate), and MOF-841 (a zirconium based MOF).

Uptake of water (adsorption, condensation, or otherwise) into pores within the interior of the MOF range between about 200 to 500 cubic centimeters per gram ($cm^3/g$) of water.

A specific surface area of the MOF ranges from about 900 to 2,000 meters squared per gram (surface area per unit of mass).

Adsorption and desorption of water into the MOF material (of the MOF condenser coil) may occur using diurnal cycles. For example, at night the MOF material may absorb water from the surrounding atmosphere, which collects in the water collection recess. The MOF material may desorb (or release) water in the form of liquid droplets during the day. Without wanting to be bound by theory, an increased water absorption activity of the MOFs may result from a temperature decrease at night compared to a daytime temperature. A temperature decrease at night may also include a decrease in barometric pressure. A variation from a daytime temperature to a nighttime temperature (and pressure) may allow water vapor in the water collection recess to reach its dew point. At the dew point, water droplets may form to condense, then settle onto a condensing surface of the MOF condenser coil. Conditions that allow a dew point may also allow a vapor pressure variation between the headspace of (or around) the condenser and a porous phase of the MOF material. "Headspace" is the vapor phase in the condenser absent the vapor phase within the porous MOFs. A vapor pressure variation may exist between the vapor phase of the condenser headspace and the vapor phase of the porous phase of the MOF material. When the vapor pressure equilibrates between the headspace at dew point and vapor phase inside the condenser, water in the vapor phase (water vapor, humidity) may begin to adsorb into the porous phase (pores) of the MOFs.

The MOF condenser coil may desorb (or release) collected water by the reverse process of uptake of water (including adsorption) into the porous phase of the MOFs. For example, a transition from a nighttime temperature to a daytime temperature may warm things up compared to the nighttime temperature. The temperature increase (and pressure) may allow adsorbed water to release from the porous phase of the MOFs.

The adsorption and desorption of water in the MOF condenser may occur passively, as described previously. In one or more embodiments, the MOF condenser coil may have optional elements to facilitate the absorption, desorption, or both, processes. Those elements may include one or more of a heater, electrical wiring, a fan, and a cooler. For example, an electrical wire with resistivity running the length of the MOF condenser coil may be used to gently heat the MOF condenser coil after a period of absorption. Such heating may drive water from the MOF condenser coil as liquid water, which then collects in the water collection recess.

Flow Conduits (Supply Lines)

In one or more embodiments, the apparatus includes a set of fluid flow conduits. Fluid flow conduits may be configured to direct water from the water collection recess, through the first fluid port, and into either the water storage tank or the lubricant storage tank depending on a configuration of the pipeline scraper. Fluid flow conduits may be configured to direct a fluid thickener from a thickener storage tank into the lubricant storage tank. Fluid flow conduits may be configured to direct lubricant from the lubricant storage tank to various second fluid ports. In one or more embodiments, the flow conduits include, but are not limited to, water lines, thickener lines, and lubricant lines.

The flow conduits are not particularly limited and may be fabricated of any suitable pipe, hose, or line, which is known in the art. The flow conduits are compatible with the materials that flow inside them. The flow conduits are further configured to withstand the environment of a pipeline, chemicals that may contact the inside or outside of the flow conduits, and general use within a pipeline scraper. The flow through the flow conduits may include liquid flow and, optionally, may include gas flow or particle flow. One of ordinary skill in the art appreciates that flow lines may be configured in more than one way to accomplish functions previously detailed.

Sensors

In one or more embodiments, the system includes one or more sensor. As previously described, there are sensors indicated as part of the system described in FIGS. 1-3. These include one or more level sensor, composition sensor, location sensor, motion sensor, and humidity sensor. The apparatus may include other sensors, such as temperature sensors, sensors that detect dragging forces, and sensors that detect changes in pipeline diameter. The pipeline scraper may have one or more type of sensor, creating redundancy for operator observation and for control system determinations.

The one or more sensor may detect one or more of the following: blade speed, apparatus speed, dragging force, temperature, pressure, and optionally density.

R/T Unit and Antenna

The R/T antenna may couple to the R/T unit that is inside the body. The R/T unit enables EM-based two-way communications. This can be a remote control unit that is manually, automatically, or both, operated.

In one or more embodiments, the apparatus includes a receiver/transmitter unit (R/T unit). The R/T unit sends and receives EM-based signals. In one or more embodiments, the R/T unit is configured to send and receive wireless radio frequency wave (RF) signal using the R/T antenna. The R/T unit may send and receive one or more EM-based using the R/T antenna. The frequency of the EM-based signal may be in a range of from about 30 hertz (Hz) to about 3,000 gigahertz (GHz). The EM-based signal may be about 1,000 megahertz (MHz). Although not wanting to be bound by theory, the 1,000 MHz range is believed to penetrate the pipeline while maintaining its EM-based signal. The R/T antenna may draw power from a battery to transmit or receive a signal.

Battery

In one or more embodiments, the apparatus includes a battery. The battery is housed onboard and inside the body of the scraper. The battery, a source of electrical or other forms of energy (for example, converted into hydraulic), energizes components of the apparatus (such as the computer). The apparatus may include one or more batteries. FIGS. 1-3 show a pipeline scraper apparatus with three batteries. A first battery supplies power to the traditional condenser unit. A second battery supplies power to the MOF condenser unit. And a third (unit) battery supplies power to other units. The other units may include control valves, sensors, pumps, receiver/transmitter equipment, and computer controller system.

In one or more embodiments, the battery is fully charged outside the pipeline before use. That is, before the apparatus is introduced into the pipeline. In one or more embodiments, the battery couples to a set of solar pads. The solar pads may charge the battery during storage or maintenance.

Computer Control System

In one or more embodiments, the apparatus includes a computer. The computer is housed inside the body of the pipeline scraper. The computer may be in signal communications with one or more device. The computer may receive a signal from the device, transmit a signal to the device, or both receive and transmit a signal.

The computer may be in one-way signal communications with one or more sensor of the pipeline scraper. For example, the computer may be in one-way signal communications to receive signals from externally positioned sensors, such as the humidity sensor and the location sensor. As well, the computer may be in one-way signal communications to receive signals from internally positioned sensors, such as a composition sensor, a level sensor, and a motion detection sensor.

The computer may be in two-way signal communications to receive and transmit signals between a lubricant storage tank control valve, a thickener storage tank control valve, or a water storage tank control valve (where one or more valve may be associated with the storage tanks). The computer may be in two-way signal communications to receive and transmit signals between the condenser coil power unit, the MOF condenser power unit, or both, to supply heat to the MOF condenser coil, cooling to the traditional condenser, or both, and to turn on, off, or selectively permit, the collection of condensed water. The computer may be in two-way signal communications to receive and transmit R/T unit signals.

Other one-way and two-way signal communications are well appreciated in the chemical engineering arts.

In one or more embodiments, the computer may store in a memory a control system program. The control system is a computer program that, based upon a signal input, uses a series of pre-determined instructions and algorithms to perform a series of logical functions (using the computer microprocessor) that may result in determining a resultant operation. The resultant operation is converted into a signal that is passed (using an input/output interface and the signal communications lines coupled to the computer) to a powered device to cause a change of state in operation of the powered device, such as the position of a control valve, the pumping rate of a pump, and the utilization of battery power by a refrigerant compressor. The operation of a sensor-feedback based computer control system program is well appreciated in the chemical engineering arts.

Two examples are provided for the computer control system and its operation.

Control System Operation, Example 1

First, the level sensor for the lubricant storage tank may indicate that an amount of lubricant in the lubricant storage tank is insufficient based upon a lubricant level set point in the memory of the computer Second, the control system (through the computer) may set a control valve outlet position (partially open) for both the water storage tank and the thickener storage tank. While this occurs, the control program (through the computer) may turn on the power to the water storage tank discharge pump and the thickener storage tank discharge pump (to facilitate pumping of water and thickener). Third, when the same lubricant level senor indicates a sufficient level of lubricant in the lubricant storage tank versus the set point in memory, the control system (through the computer) may reverse these actions to halt fabrication of lubricant.

Control System Operation, Example 2

First, sensor may indicate that the rate of forward velocity of the apparatus over a period is insufficient based upon a forward velocity set point in the memory of the computer. For example, a set point for sufficient forward velocity may be 1 meter per second (1 m/s). Second, the control system (through the computer) may turn on a lubricant storage tank discharge pump. While this occurs, the control system (through the computer) may position one or more control valves to selectively allow lubricant to flow. That is, lubricant may flow from the lubricant storage tank, through lubricant flow lines, second fluid ports, one or more lubricant nozzle, if present, and coat the exterior surface of the pipeline scraper with lubricant. Third, when the same sensor indicates that the rate of forward velocity is sufficient based upon a set point in memory, the control system (through the computer) may reverse these actions to halt the supply of lubricant to the exterior surface of the pipeline scraper.

Control System Features

The control system, through the computer and the R/T unit, may also send a signal to a remote control unit showing the change in status.

The control system may take actions intermittently, such as upon sensory feedback, as previously described. The control system may take actions periodically, such as based upon the expiration of time. For example, the lubricant may discharge through the one or more lubricant nozzle on a regular and timed basis, such as 10 minutes after the last lubricant discharge. The control system may act continually, such as monitoring and recording to a memory storage device detected measurements within the pipeline.

The control system may take actions based upon the receipt of a command signal through the R/T unit. A remote control unit provided command signal may be received through the R/T antenna, converted into a signal by the R/T unit, relayed to the computer, interpreted as a command signal, and then followed by the control system program. In one or more embodiments, the control system may direct a response signal back through the R/T unit acknowledging the remote-received command signal. A remote control unit may signal to the apparatus one or more of the following commands: maneuvering speed commands, direction commands (such as GPS), on/off commands, and apparatus velocity commands. Apparatus velocity commands may include an overall velocity. A signal may be sent when a forward speed is less than 1 meter per second (m/s)). Apparatus velocity commands may include a rotational speed of the apparatus ("blade speed"). A signal may be sent when a rotational velocity is from 0 to 1 m/s (about 9 to 10 revolutions per minute). The control system program, using the computer to process the information and send signals to control-capable devices, may: receive data from a sensor and determine the level of water in the water storage tank; receive data from a sensor and determine the level of thickener in the thickener storage tank; receive data from a sensor and determine the level of lubricant in the lubricant storage tank; and receive data from a sensor and determine the composition of the lubricant in the lubricant storage tank.

The control system program, using the computer to process the information and send signals to control-capable devices, may: selectively control the position of a control valve between the water storage tank and the lubricant storage tank; selectively control the position of a control valve between the thickener storage tank and the lubricant storage tank; selectively control the position of a control valve between the lubricant storage tank and the lube nozzle(s).

The control system program, using the computer to process the information and send signals to control-capable devices, may: selectively control the operation of a pump between the water storage tank and the lubricant storage tank; selectively control the operation of a pump between the water storage tank and the lubricant storage tank; selectively control the operation of a pump between the lubricant storage tank and the one or more lube nozzle.

The control system program, using the computer to process the information and send signals to control-capable devices, may: selectively control the power applied by the MOF condenser power unit to the MOF condenser coil; selectively control the power applied by the MOF condenser unit fan to cool the MOF condenser power unit (and MOF condenser coil when applicable); selectively control the power applied by the condenser coil power unit to the condenser coil with a hydrophobic coating.

The control system program, using the computer to process the information and send signals to control-capable devices, may: receive data from a sensor and determine the amount of charge in the one or more battery; receive data from a sensor and determine if the apparatus has stopped moving, is moving, and at what velocity (such as when receiving data from a motion sensor); receive data from a sensor and determine the relative humidity of the vapor around the scraper (such as when receiving data from a humidity sensor); receive data from a sensor and determine the relative position of the pipeline scraper (such as when receiving data from a location sensor); receive data from the R/T unit and interpret commands based upon onboard instructions; convey data to the R/T unit to transmit information using the R/T transmitter.

In one or more embodiments, there is no control system program associated with the computer. The computer receives command signals from a remote control unit through the R/T unit. The computer upon interpreting the command signal then executes the provided commands based upon operational instructions stored in memory. In one or more embodiments, the computer may receive detected signals from various sensors and units and relay such data to the remote control unit using the R/T unit.

Methods of Use

Figure 4A:
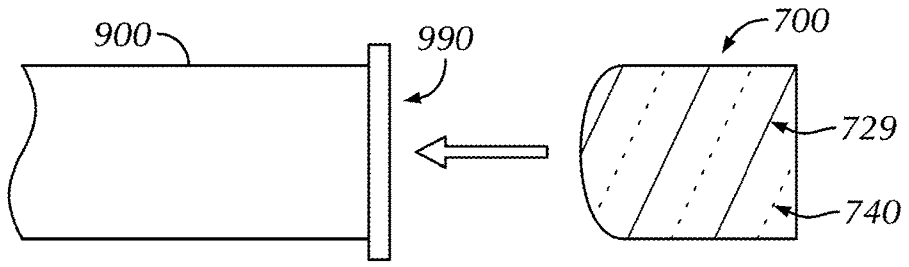
FIG. 4A shows a side view of the pipeline and pipeline scraper according to one or more embodiments.

In one or more embodiments, a method of use of the pipeline scraper may include introducing the pipeline scraper of one or more embodiments into the pipeline. For example, in FIG. 4A shows a pipeline scraper 700 with scraping rifling 729 and second fluid ports 740. As configured, pipeline scraper 700 does not have a blade; rather, the body has scraping rifling that contacts the interior surface of the pipeline to assist in removing debris. The diameter of the body of pipeline scraper is similar to the interior diameter of the pipeline such that the body of the pipeline scraper contacts the interior surface of the pipeline. The pipeline scraper 700 is introduced into the pipeline 900 via pipeline entry 990.

When the apparatus is introduced into the pipeline, there may be product in the line and flowing. However, if the apparatus is introduced into the pipeline with product in the line and flowing, the envisioned pipeline pressure is about 15 pounds per square inch (psi) or less.

Figure 4B:
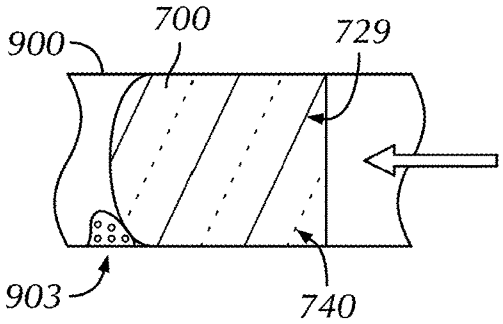
FIG. 4B shows the pipeline scraper traversing the pipeline according to one or more embodiments.

In one or more embodiments, a method of use of the pipeline scraper may include operating the pipeline such that the pipeline scraper traverses a portion or more than a portion of the pipeline. As shown in FIG. 4B, pipeline scraper 700 is traversing pipeline 900. In some embodiments, the pipeline scraper is motivated by pressure differential. A reduced pressure downstream, an increased pressure upstream, or both, and an appropriate seal between the pipeline scraper exterior surface and the interior surface of the pipeline may permit a pressure differential between the ends of the pipeline scraper to form, motivating the pipeline scraper through the pipeline. In some other embodiments, the pipeline scraper is motivated by fluid flow within the pipeline, that is, a slug of a liquid aft of the pipeline scraper physically pushing the apparatus along.

While traversing the pipeline, the pipeline scraper may contact the inside surface of the pipeline such that materials to be cleaned, including, but not limited to, debris, sludge, scale, aggregates, and carbon buildup, on the interior surface of the pipeline are removed and pushed in front of the apparatus. For example, in FIG. 4B the pipeline scraper 700 rotates as it traverses (arrow) the pipeline 900 such that a helical scraping pattern form. Debris pile 903 forms at the front of the pipeline scraper 700 as it traverses the pipeline 900.

While traversing the pipeline, a situation may occur that retards or inhibits movement of the pipeline scraper. For example, as shown in FIG. 4C, pipeline scraper 700 has been impaled on a dent 905 in the pipeline 900. This obstruction halts the forward progress of the pipeline scraper 700 (arrow with X).

The pipeline scraper may be freed from a pipeline obstruction with the self-lubrication system of one or more embodiments. This self-lubrication system may also overcome traditional means to free a pipeline scraper. Traditional means to free a pipeline scraper may include increasing differential pressure between the pipeline scraper, increasing pressure of the now-stagnant fluid behind the pipeline scraper, increasing power to the pipeline scraper, adding additional tractors to push or pull the pipeline scraper, or "spearing" the pipeline scraper with a removal tool.

In one or more embodiments, a method of use of the pipeline may include operating the pipeline scraper apparatus such that lubricant is introduced from the interior of a pipeline scraper onto the exterior surface of the pipeline scraper. As previously described, the lubricant serves multiple functions, including protecting the exterior surfaces from corrosion and erosion. The lubricant may also serve to reduce both the static and the kinetic coefficients of friction between the pipeline scraper and the interior surface of the pipeline, as previously described. In such cases, the static coefficient of friction may be substantially reduced. In other cases, the kinetic coefficient of friction may be substantially reduced.

Figure 4D:
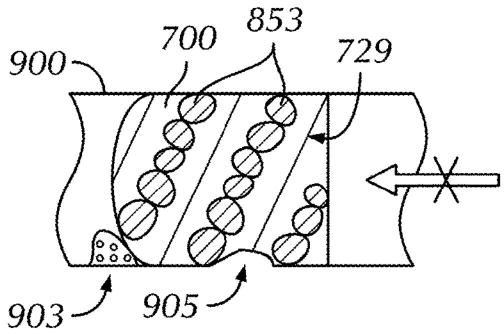
FIG. 4D shows the pipeline scraper introducing lubricant from the interior of the pipeline scraper onto the exterior surface of the pipeline scraper according to one or more embodiments.
Figure 4C:
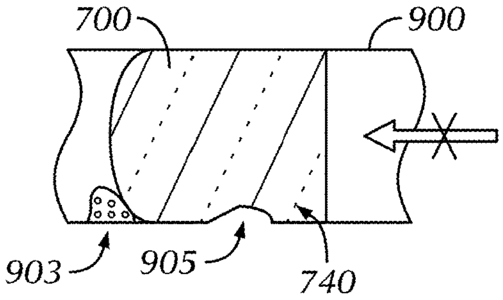
FIG. 4C shows the pipeline scraper impaled on a dent in the pipeline according to one or more embodiments.

As shown in FIG. 4D, the pipeline scraper is shown introducing lubricant from the interior of the pipeline scraper 700 onto the exterior surface of the pipeline scraper 700. In this instance, the introduction of lubricant is sufficient to form a lubricant pool 853 between the exterior surface of the pipeline scraper and the interior surface of the pipeline. The lubricant pools 853 contact both the exterior surface of the pipeline scraper 700 and the interior surface of the pipeline 900 due to the diameter of the body of pipeline scraper 700 with respect to the interior diameter of the pipeline 900. The lubricant pools 853 are shown spreading outward from the second fluid ports (not shown), reducing the coefficients of friction between pipeline scraper and 700 and pipeline 900.

In one or more embodiments, the pipeline scraper apparatus is operated such that lubricant is introduced from the lubricant storage tank of the pipeline scraper onto the exterior surface. The method may include introducing the lubricant onto the exterior surface of the body of the pipeline scraper. In one or more embodiments, the method includes introducing the lubricant onto the exterior surface of one or more blade of the pipeline scraper. In one or more embodiments, the method includes introducing the lubricant onto the interior surface of the pipeline. When the lubricant is introduced into the pipeline, the lubricant may cover either a part of the inner wall of the pipeline or the circumference of the inner wall of the pipeline where the pipeline scraper is located.

The pipeline system apparatus, such as through a computer control program in the memory of a computer or by receiving a command signal from a remote control unit, may introduce the lubricant. In one or more embodiments, the method includes introducing the lubricant intermittently, as previously described. In one or more embodiments, the method includes introducing lubricant periodically, as previously described. In one or more embodiments, the method includes introducing the lubricant continuously, as previously described.

An example of intermittent introduction of lubricant may include use of the motion sensor. In one or more embodiments, a movement of the pipeline scraper in the pipeline may be detected. In one or more embodiments, the forward velocity of the pipeline scraper may be determined to be insufficient, such as less than 1 m/s. Such a determination may be made automatically, such as by a computer control program residing in memory of a computer, manually, such as through receipt of a signal from the pipeline scraper to a remote control unit, or a combination of both.

Figure 4E:
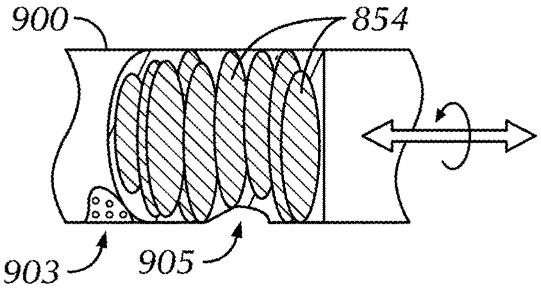
FIG. 4E shows the formation of one or more lubricating films according to one or more embodiments.

In one or more embodiments, a method for treating an interior surface of a pipeline may include operating the pipeline such that a lubricating film forms between the pipeline scraper and an interior surface of the pipeline. As shown in FIG. 4D, pipeline scraper 700 may be manipulated using well-known techniques such that the lubricant pools 853 are smeared across the exterior surface of both the pipeline scraper 700 and the interior of the pipeline 900, forming one or more lubricating films 854 as shown in FIG. 4E. For example, the pipeline scraper may be moved back and forth laterally, rotationally, or both, at its position in the pipeline, to convert the lubricant pools into a thin lubricant film. During this operation, additional lubricant may be introduced onto the exterior surface of the pipeline scraper and the interior surface of the pipeline to continue to attempt to reduce the coefficients of friction sufficiently to permit the pipeline scraper to advance past the obstruction.

Figure 4F:
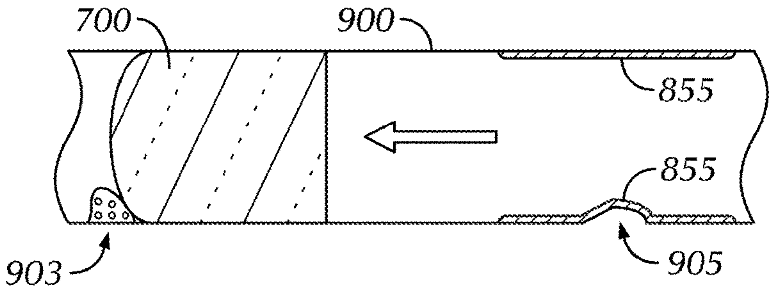
FIG. 4F shows pipeline scraper that is freed from a dent after sufficient lubricant has been applied according to one or more embodiments.

FIG. 4F shows pipeline scraper 700 having been freed from and downstream of dent 905 after sufficient lubricant and force has been applied. Lubricant coating 855 remains on the interior surface of the pipeline 900 proximate to the location of dent 905, which may prevent any additional pipeline clearing or inspection systems from becoming stuck or trapped on the obstruction. Now-freed pipeline scraper 700 continues its traversal down pipeline 900 while pushing debris pile 903.

In one or more embodiments, the pipeline scraper apparatus is operated such that a lubricant forms in the lubricant storage tank. As previously described, the lubricant may be a mixture of a thickening agent to water, with a ratio of thickening agent to water in a range of from about 10:1 to about 1:10. In one or more embodiments, the thickening agent is xanthan gum, guar gum, or a combination of xanthan gum and guar gum. The operating temperature of the lubricant may be in a range of from about 30 to 55° C.

In one or more embodiments, a level of lubricant in the lubricant storage tank may be detected. In one or more embodiments, the level of the lubricant in the lubricant storage tank may be determined to be insufficient. Such a determination may be made automatically, such as by a computer control program residing in memory of a computer, made manually, such as through receipt of a signal from the pipeline scraper associated with the level reading to a remote control unit, or a combination of both.

In response to the determination of an insufficient amount of lubricant in the lubrication storage tank and, in one of more embodiments, an amount of thickening agent may be introduced to the lubricant storage tank to replenish the lubricant. In some such embodiments, the thickening agent may be introduced to the lubrication storage tank from a thickening agent storage tank. In one or more embodiments, an amount of water may be introduced to the lubrication storage tank to replenish the lubricant. In some such embodiments, the water may be introduced to the lubrication storage tank from a water storage tank. In other such embodiments, the water, such as condensed water, may be introduced to the lubrication storage tank from the water collection recess. Such an introduction from either the thickening agent or the water storage tanks, or both, may be made automatically, such as by a computer control program residing in memory of a computer, made manually, such as through receipt of a command signal from a remote control unit, or a combination of both.

In one or more embodiments, the pipeline scraper apparatus is operated such that a condensed water is collected in the water collection recess and is introduced into the interior space.

In one or more embodiments, a level of water in the water storage tank may be detected. In one or more embodiments, the level of the water in the water storage tank may be determined to be insufficient. Such a determination may be made automatically, manually, such as through receipt of a signal from the pipeline scraper associated with the level reading, or a combination of both.

In one or more embodiments, an actual vapor pressure of the vapor around the pipeline scraper apparatus may be detected. The relative humidity (RH) of the vapor around the pipeline scraper apparatus may be determined to be in a range of from about 0 to 100% (percent), such as greater than 0%, greater than about 5%, to greater than 10%, to about 15%, to about 30%, to about 50%, to about 80%, to about 90%, to about 95%, and to about 100%. Likewise, the relative humidity (RH) of the vapor around the pipeline scraper apparatus may be determined to be in a range from 100% or less, such as 95% or less, 90% or less, 85% or less, 80% or less, 75% or less, 70% or less, 65% or less, 60% or less, 55% or less, 50% or less, 45% or less, 40% or less, 35% or less, and 30% or less. As previously stated, the general humidity range within a pipeline may reach up to 80% humidity; however, some pipelines carry hydrocarbon gases that are "dry", meaning the relative humidity approaches zero. Such a determination may be made automatically, manually, such as through receipt of a signal from the pipeline scraper associated with the humidity reading, or a combination of both.

In one or more embodiments, the relative humidity is determined while the pipeline scraper is positioned outside of a pipeline. In other embodiments, the value of relative humidity is determined while the pipeline scraper is positioned inside of a pipeline.

In response to the determination of an insufficient amount of water in the water storage tank and to replenish the water, the pipeline scraper apparatus is operated such that the condensed water in the water collection recess is introduced into the interior space of the apparatus, such as the water storage tank. Such an introduction of condensed water may be made automatically, made manually, or a combination of both.

In one or more embodiments, the pipeline scraper apparatus is operated such that condensed water is collected in the water collection recess. Water is condensed from the vapor present in the water collection recess by the condenser coil, as previously described. In one or more embodiments, the condenser coil is a traditional condenser coil. In some such embodiments, the traditional condenser coil has an exterior surface that comprises a hydrophobic coating. In one or more embodiments, the condenser coil comprises a metal organic framework (MOF). Operation of the pipeline scraper apparatus such that the condenser coil condenses water in the water collection recess may be made automatically, made manually, or a combination of both.

In one or more embodiments, the pipeline scraper apparatus is operated when positioned inside of a pipeline such that condensed water is collected in the water collection recess. In one or more embodiments, the pipeline scraper apparatus is operated when outside of a pipeline such that condensed water is collected in the water collection.

In one or more embodiments, condensed water is collected in the water collection recess when the relative humidity is determined to be in a range of up to 30%. In embodiments where the condenser coil is comprised of MOF, the condenser coil may not be operated when the relative humidity is determined to be greater than 30%. Such a limitation may be used to prevent damage to the MOF material. In embodiments of the pipeline scraper apparatus where the condenser coil is configured as a traditional condenser coil, the condenser coil may operate at any relative humidity. In some embodiments, the traditional condenser coil is operated when the relative humidity is determined to be greater than 30%.

In one or more embodiments, the pipeline scraper apparatus is operated when positioned inside of a pipeline such that the condensed water in the water collection recess is introduced into the interior space of the apparatus. In other embodiments, the pipeline scraper apparatus is operated when positioned outside of a pipeline such that the condensed water in the water collection recess is introduced into the interior space of the apparatus.

In one or more embodiments, the pipeline scraper apparatus is operated when positioned outside of a pipeline such that a battery internal to the pipeline scraper receives energy. In some such embodiments, a solar pad on the exterior surface of the pipeline scraper apparatus is exposed to an EM source, including, but not limited to, the sun, to produce energy. In such instances, the energy produced by the solar pad may be directed in part to charge the battery. In other such embodiments, the pipeline scraper apparatus is positioned in a docking station and energy to charge the battery is received through a power coupling means.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it should be understood that another one or more embodiments is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed is:

1. A pipeline scraper apparatus for cleaning an inside surface of a pipeline, the pipeline scraper apparatus comprising:

a body having an exterior surface, a water collection recess, a first fluid port, and a second fluid port, and defining an interior space, where the first fluid port is positioned within the water collection recess;

a condenser coil that is positioned within the water collection recess to condense water from a vapor into a liquid that is present in the water collection recess; and a lubricant storage tank that is positioned within the interior space, is fluidly coupled downstream of the first fluid port, and is configured to contain a lubricant comprised of a mixture of water and a thickening agent;

where the second fluid port is fluidly coupled downstream of the lubricant storage tank and is configured to distribute the lubricant onto the exterior surface of the body.

2. The pipeline scraper apparatus of claim 1, further comprising a nozzle that is coupled to the exterior surface of the body and is fluidly coupled downstream of the second fluid port, and is configured such that lubricant passing through the nozzle sprays the lubricant onto the exterior surface of the body.

3. The pipeline scraper apparatus of claim 1, further comprising a water storage tank that is positioned within the interior space, is fluidly coupled downstream of the first fluid port and upstream of the lubricant storage tank, and is configured to contain water.

4. The pipeline scraper apparatus of claim 1, further comprising a thickener storage tank that is positioned within the interior space, is fluidly coupled upstream of the lubricant storage tank, and is configured to contain the thickening agent.

5. The pipeline scraper apparatus of claim 1, where the condenser coil has an exterior surface that comprises a hydrophobic coating.

6. The pipeline scraper apparatus of claim 1, where the condenser coil comprises a metal organic framework (MOF).

7. The pipeline scraper apparatus of claim 1, further comprising more than one blade, where the more than one blade has an exterior surface, is coupled to and extends outwards from the exterior surface of the body, and where an outer portion of the more than one blade has a scraping edge.

8. The pipeline scraper apparatus of claim 1, further comprising one or more blade, where the second fluid port is configured to distribute the lubricant onto the exterior surface of the one or more blade, and where the second fluid port is a plurality of fluid ports.

9. The pipeline scraper apparatus of claim 8, further comprising a nozzle that is coupled to the exterior surface of the body and is fluidly coupled downstream of the plurality of second fluid ports, and is configured such that lubricant passing through the nozzle sprays the lubricant onto the exterior surface of the one or more blade.

10. A method for cleaning a pipeline, the method comprising:

introducing a pipeline scraper apparatus into the pipeline;

traversing the pipeline scraper through a portion of the pipeline using a driving force from a liquid flowing through the pipeline; and contacting an inside surface of the pipeline such that materials selected from the group consisting of debris, sludge, scale, aggregates, carbon buildup, and combinations thereof, are pushed in front of the pipeline scraper apparatus;

wherein the pipeline scraper apparatus comprises a body having an exterior surface and a water collection recess, and defining an interior space; a condenser coil that is positioned within the water collection recess; and a lubricant storage tank that is positioned within the interior space.

11. The method of claim 10, further comprising operating the pipeline scraper apparatus such that a lubricant is introduced from the lubricant storage tank onto the exterior surface.

12. The method of claim 11, where the exterior surface of the pipeline scraper apparatus includes the exterior surface of one or more of a plurality of blades.

13. The method of claim 11, where the lubricant is also introduced onto an interior surface of the pipeline.

14. The method of claim 11, where the lubricant is introduced intermittently.

15. The method of claim 11, where the lubricant is introduced upon determining that a forward velocity of the pipeline scraper apparatus is insufficient.

16. The method of claim 10, further comprising operating the pipeline scraper apparatus such that a lubricant forms in the lubricant storage tank.

17. The method of claim 16, where the lubricant is a mixture of a thickening agent and water with a ratio of thickening agent to water in a range of from about 10:1 to about 1:10.

18. The method of claim 10, further comprising operating the pipeline scraper apparatus such that condensed water is collected in the water collection recess and is introduced into the interior space.

19. The method of claim 18, where the condensed water is collected in the water collection recess when a relative humidity of vapor around the pipeline scraper apparatus is determined to be in a range of 30% or less.

20. The method of claim 18, where the condensed water is introduced into a water storage tank, where the water storage tank is positioned within the interior space and is fluidly coupled upstream of the lubricant storage tank.

* * * * *